US010505650B2

(12) United States Patent
Fukuta et al.

(10) Patent No.: US 10,505,650 B2
(45) Date of Patent: Dec. 10, 2019

(54) RADIO TERMINAL AND NETWORK APPARATUS

(71) Applicant: KYOCERA CORPORATION, Kyoto (JP)

(72) Inventors: Noriyoshi Fukuta, Inagi (JP); Masato Fujishiro, Yokohama (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/567,916

(22) PCT Filed: Apr. 27, 2016

(86) PCT No.: PCT/JP2016/063254
§ 371 (c)(1),
(2) Date: Oct. 19, 2017

(87) PCT Pub. No.: WO2016/175255
PCT Pub. Date: Nov. 3, 2016

(65) Prior Publication Data
US 2018/0131458 A1 May 10, 2018

Related U.S. Application Data

(60) Provisional application No. 62/153,230, filed on Apr. 27, 2015.

(51) Int. Cl.
*H04H 60/46* (2008.01)
*H04W 4/06* (2009.01)
*H04H 20/57* (2008.01)
(52) U.S. Cl.
CPC ............ *H04H 60/46* (2013.01); *H04H 20/57* (2013.01); *H04W 4/06* (2013.01)

(58) Field of Classification Search
CPC .......... H04H 60/46; H04H 20/57; H04W 4/06
USPC ........................................................ 370/312
See application file for complete search history.

(56) References Cited

U.S. PATENT DOCUMENTS

| 2003/0114177 | A1 | 6/2003 | Sinnarajah et al. |
| 2006/0252439 | A1 | 11/2006 | Cai |
| 2011/0305183 | A1 | 12/2011 | Hsu et al. |
| 2011/0319011 | A1 | 12/2011 | Dong et al. |

(Continued)

FOREIGN PATENT DOCUMENTS

| JP | 2005-500762 A | 1/2005 |
| JP | 2006-526316 A | 11/2006 |
| JP | 2013-534087 A | 8/2013 |

OTHER PUBLICATIONS

International Search Report issued in PCT/JP2016/062355; dated Jul. 5, 2016.

(Continued)

*Primary Examiner* — Faisal Choudhury
(74) *Attorney, Agent, or Firm* — Studebaker & Brackett PC

(57) ABSTRACT

A radio terminal according to an embodiment comprises: a controller configured to notify a network apparatus of an MBMS interest indication for announcing that the radio terminal is receiving an MBMS (Multimedia Broadcast Multicast Service) service or is interested in receiving the MBMS service. The controller includes an identifier of a certain MBMS service which the radio terminal is receiving or is interested in receiving the MBMS service, into the MBMS interest indication.

3 Claims, 14 Drawing Sheets

(56) References Cited

U.S. PATENT DOCUMENTS

| | | | | |
|---|---|---|---|---|
| 2013/0294325 | A1* | 11/2013 | Lee | H04W 76/20 370/312 |
| 2013/0315150 | A1 | 11/2013 | Koskinen | |
| 2014/0105095 | A1 | 4/2014 | Lee et al. | |
| 2014/0153476 | A1* | 6/2014 | Wang | H04W 4/06 370/312 |
| 2015/0230205 | A1* | 8/2015 | Lin | H04W 72/005 370/312 |
| 2015/0334769 | A1* | 11/2015 | Kim | H04W 36/36 370/329 |
| 2016/0295443 | A1* | 10/2016 | Mizusawa | H04W 24/02 |
| 2016/0337818 | A1* | 11/2016 | Keskitalo | H04W 4/06 |
| 2018/0103356 | A1* | 4/2018 | Wang | H04W 76/45 |
| 2018/0206137 | A1* | 7/2018 | Ryu | H04W 4/70 |
| 2018/0288576 | A1* | 10/2018 | Xu | H04W 4/06 |

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2; 3GPP TS 36.300 V12.5.0; Mar. 2015; pp. 1-251; Release 12; 3GPP Organizational Partners.

Huawei et al.; "Open Issues for MBMSInterestIndication", 3GPP TSG-RAN WG2 Meeting #76, R2-116106; Nov. 14-18, 2011; pp. 1-4; San Francisco, USA.

ZTE; "Clarification on Mode 1 Resource Allocation Procedure"; 3GPP TSG-RAN WG2 Meeting #87bis; R2-144463; Oct. 6-10, 2014; pp. 1-5; Shanghai, P.R. China.

3rd Generation Partnership Project; Technical Specification Group Radio Access Network; Evolved Universal Terrestrial Radio Access (E-UTRA); Radio Resource Control (RRC); Protocol Specification; 3GPP TS 36.331 V12.5.0; Mar. 2015; pp. 1-5; Release 12; 3GPP Organizational Partners.

Qualcomm Incorporated; "Handling of MAC Reserved Values on MCH"; 3GPP TSG-RAN WG2 Meeting #89bis; R2-151614; Apr. 20-24, 2015; pp. 1-3; Bratislava, Slovakia.

3rd Generation Partnership Project; Technical Specification Group Radio Access Network; Introduction of the Multimedia Broadcast Multicast Service (MBMS) in the Radio Access Network (RAN); Stage 2; 3GPP TS 25.346 V6.9.1; Sep. 2009; pp. 1-2; Release 6; 3GPP Organizational Partners.

* cited by examiner

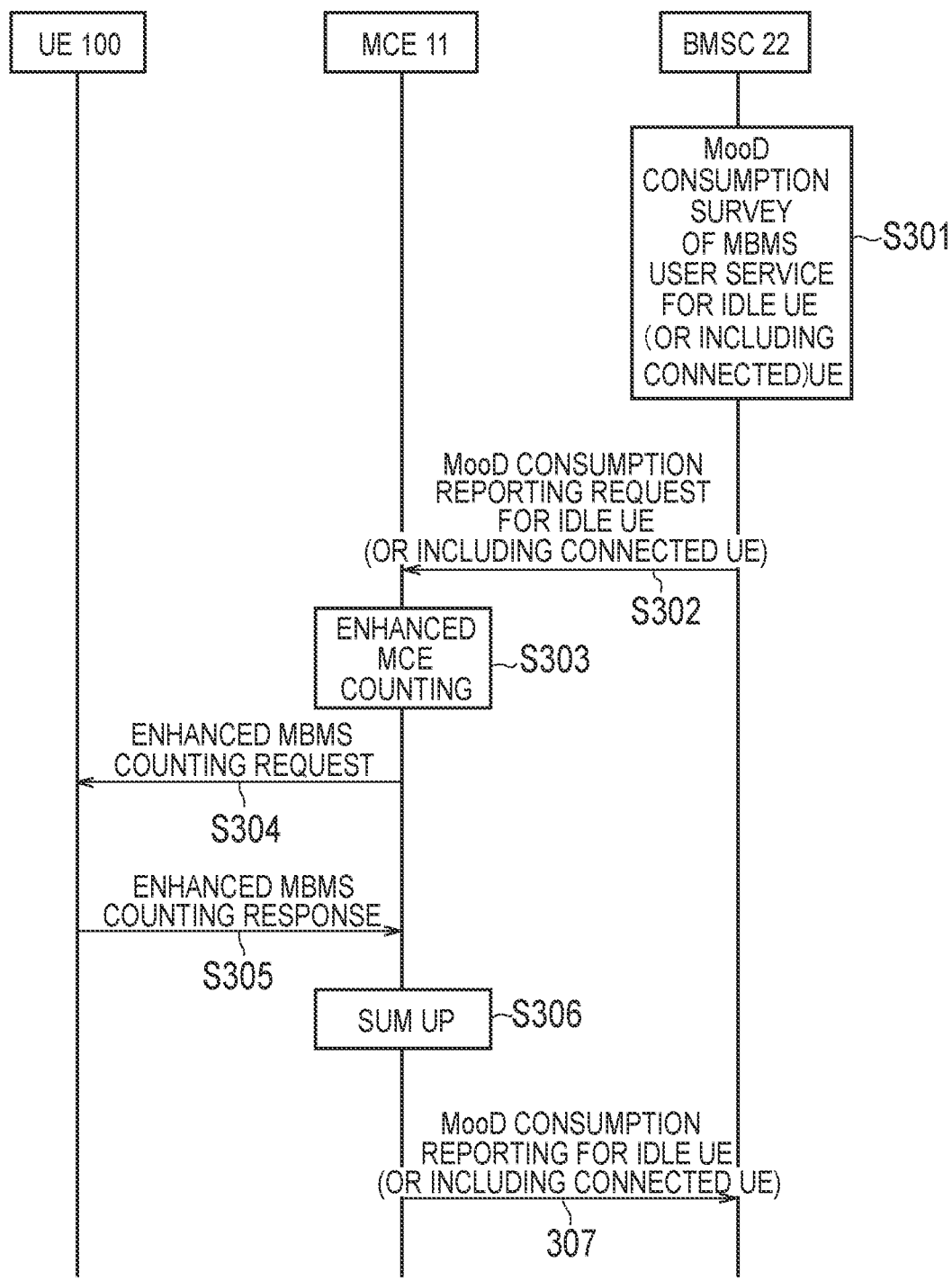

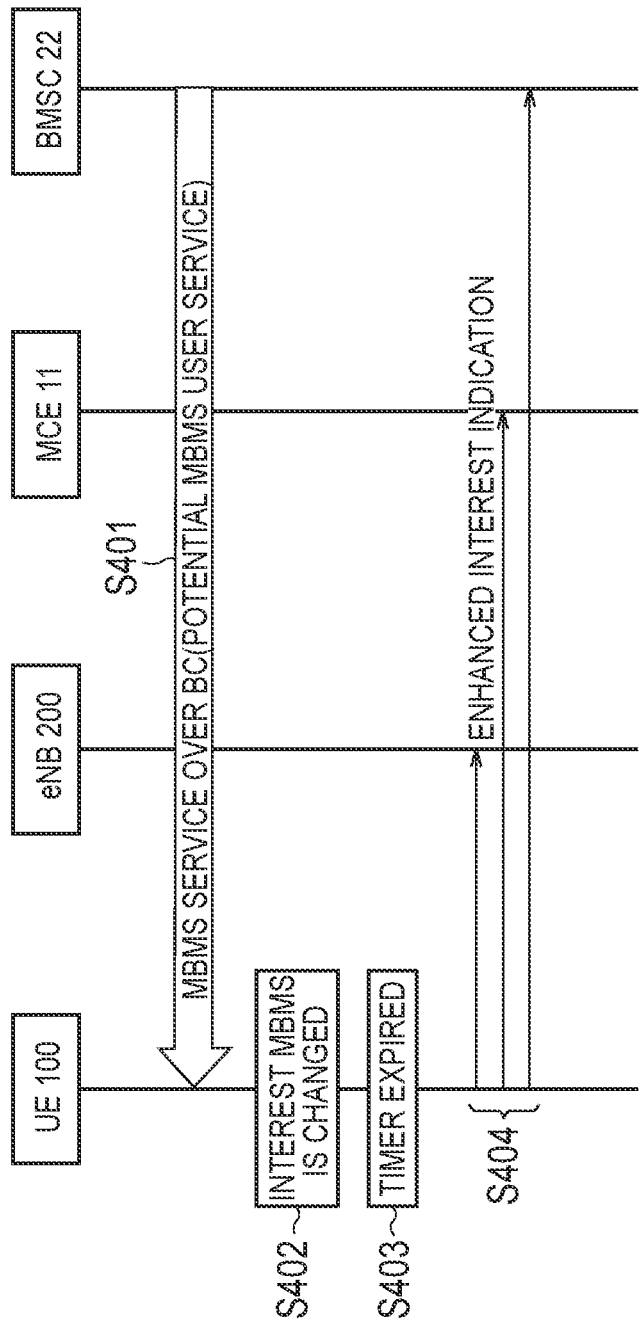

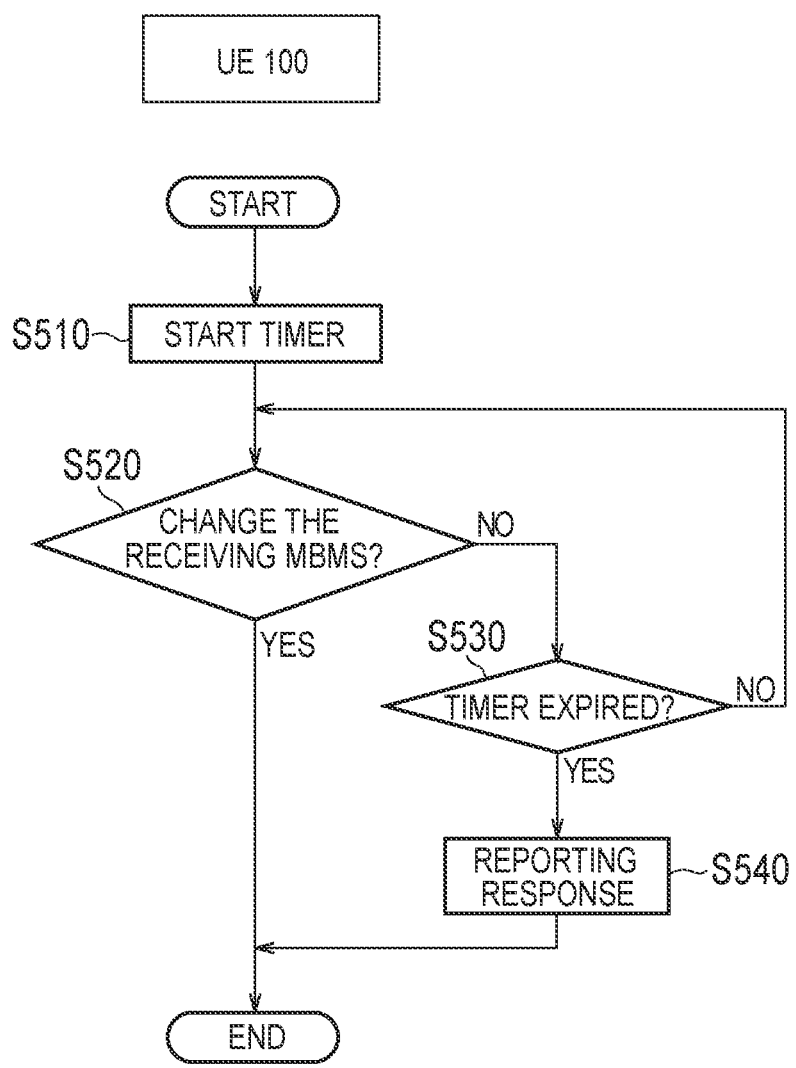

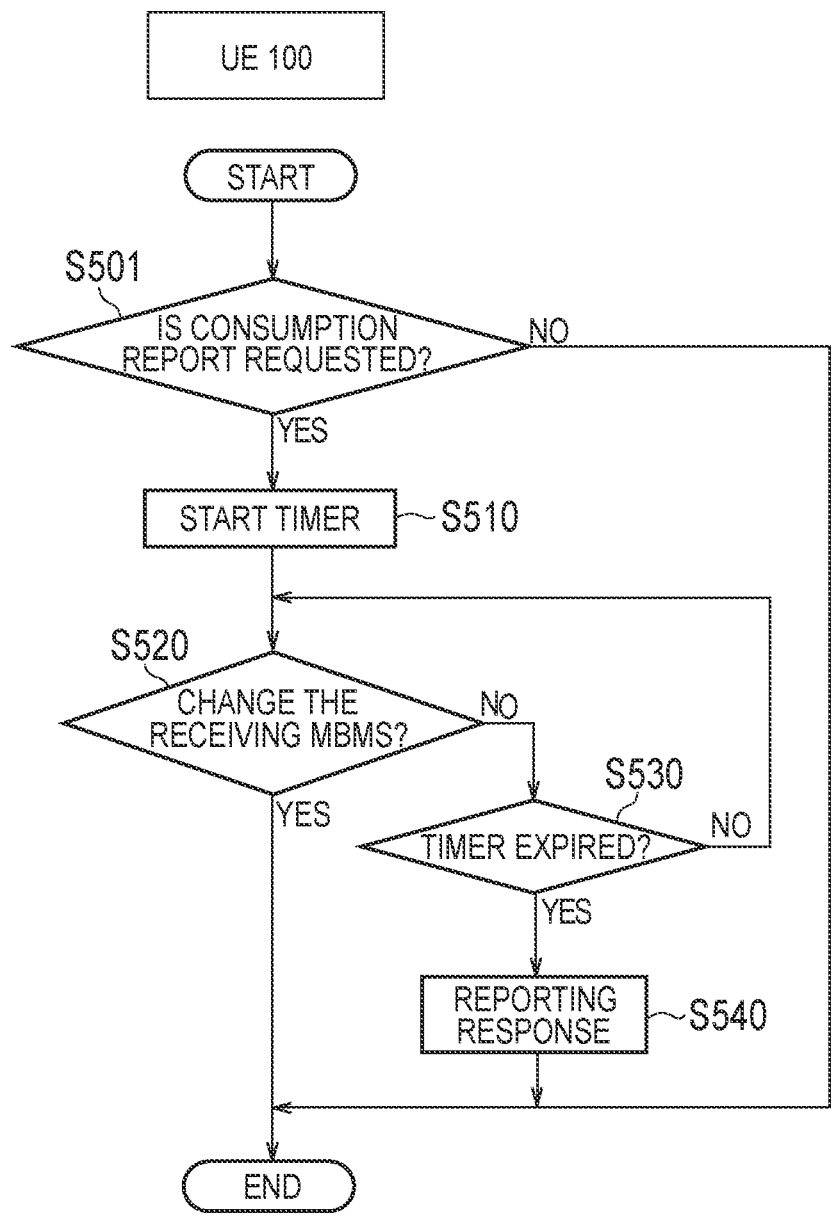

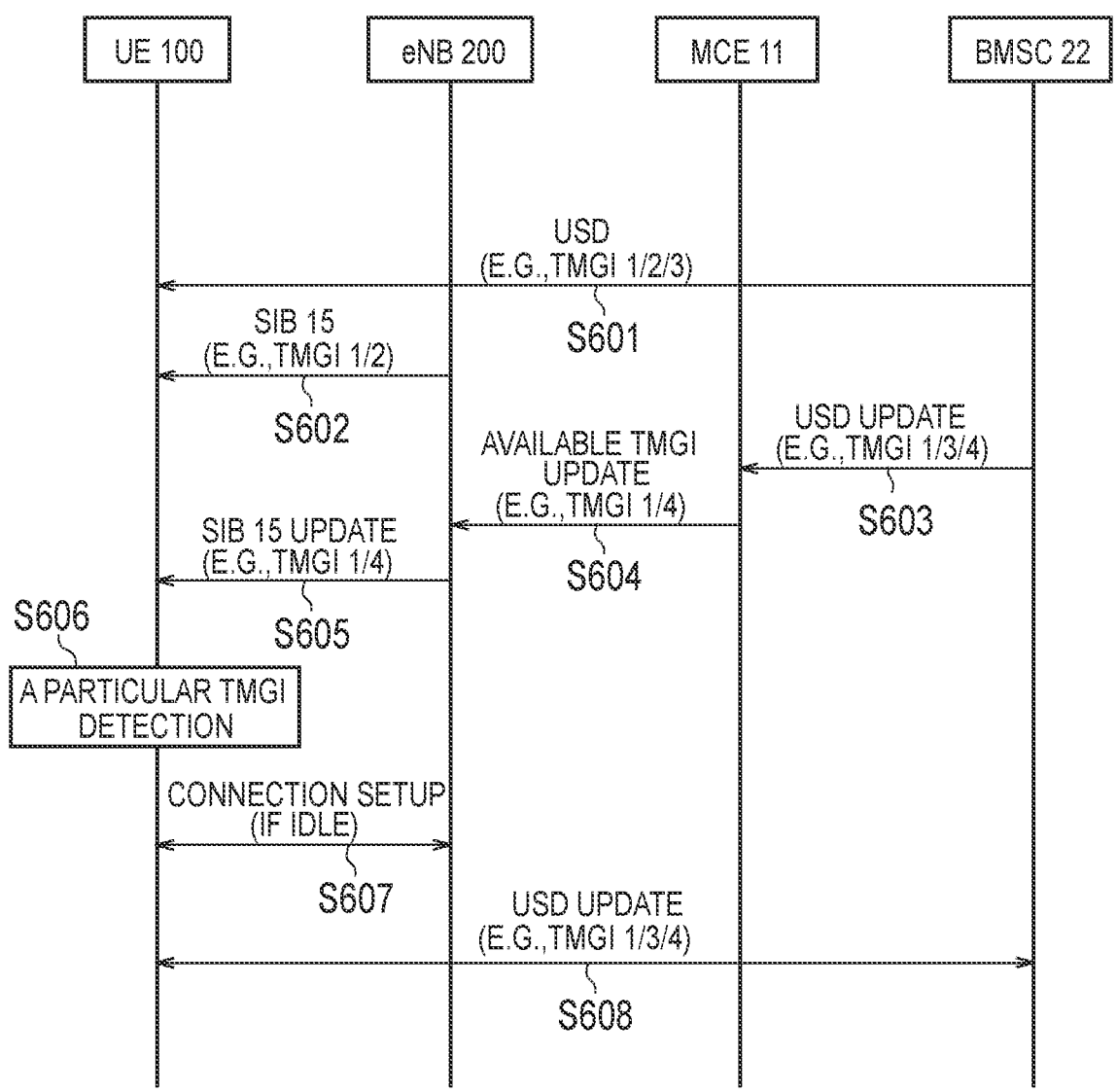

RADIO TERMINAL AND NETWORK APPARATUS

TECHNICAL FIELD

The present application relates to a radio terminal and a network apparatus used in a mobile communication system.

BACKGROUND ART

In 3GPP (3rd Generation Partnership Project), which is a project aiming to standardize a mobile communication system, the specifications of MBMS (Multimedia Broadcast Multicast Service) have been designed. In the MBMS, a radio terminal receives an MBMS service provided over multicast or over broadcast from a network of a mobile communication system (see Non Patent Document 1).

PRIOR ART DOCUMENT

Non-Patent Document

Non Patent Document 1: 3GPP Technical Specification "TS 36.300 V12.5.0", Mar. 25, 2015

SUMMARY OF THE INVENTION

A radio terminal according to an embodiment comprises: a controller configured to notify a network apparatus of an MBMS interest indication for announcing that the radio terminal is receiving an MBMS (Multimedia Broadcast Multicast Service) service or is interested in receiving the MBMS service. The controller includes an identifier of a certain MBMS service which the radio terminal is receiving or is interested in receiving the MBMS service, into the MBMS interest indication.

A network apparatus according to an embodiment comprises: a controller configured to notify a radio terminal of a request for counting the number of radio terminals being receiving an MBMS (Multimedia Broadcast Multicast Service) service or being interested in receiving the MBMS service; and a receiver configured to receive a response to the request from the radio terminal. The controller activates a timer after notifying the request. The controller counts the number of the response received before the timer expires.

A radio terminal according to an embodiment comprises: a receiver configured to receive, from a network apparatus, a request for counting the number of radio terminals being receiving an MBMS (Multimedia Broadcast Multicast Service) service or being interested in receiving the MBMS service; and a controller configured to activate a timer in response to the reception of the request. The controller notifies the network apparatus of the response before the timer expires if being receiving the MBMS service or interested in receiving the MBMS service.

The radio terminal comprises: a receiver configured to receive control information transmitted via an MCH (Multicast Channel) from a network apparatus; and a controller configured to notify, if information indicating a request for counting the number of a certain radio terminal is included in the control information, the network apparatus of a response to the request. The certain radio terminal is a radio terminal being receiving a certain MBMS (Multimedia Broadcast Multicast Service) service transmitted via a certain MTCH (Multicast Traffic Channel) or being interested in receiving the certain MBMS service.

BRIEF DESCRIPTION OF THE DRAWINGS

FIG. 11 is a sequence chart for describing an operation example 3 according to the first embodiment.

FIG. 12 is a sequence chart for describing an operation example 4 according to the first embodiment.

FIG. 13 is a flowchart (part 1) for describing the operation example 4 according to the first embodiment.

FIG. 14 is a flowchart (part 2) for describing the operation example 4 according to the first embodiment.

FIG. 15 is a sequence diagram for describing an operation according to a second embodiment.

DESCRIPTION OF THE EMBODIMENT

Overview of Embodiment

Figure 1:
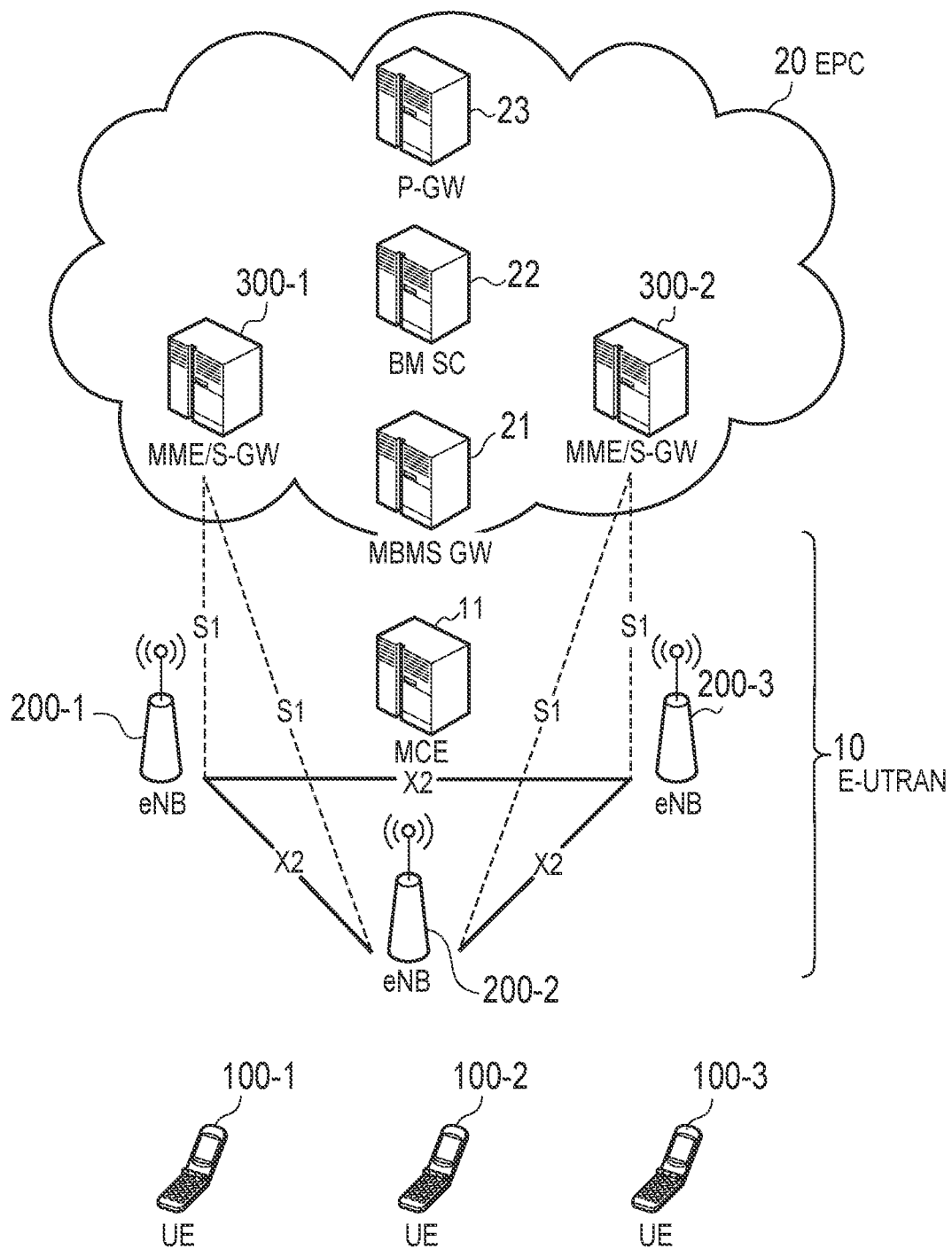
FIG. 1 is a diagram illustrating a configuration of an LTE system.

A radio terminal according to an embodiment may comprise: a controller configured to notify a network apparatus of an MBMS interest indication for announcing that the radio terminal is receiving an MBMS (Multimedia Broadcast Multicast Service) service or is interested in receiving the MBMS service. The controller may include an identifier of a certain MBMS service which the radio terminal is receiving or is interested in receiving the MBMS service, into the MBMS interest indication.

The controller may notify the MBMS interest indication including the identifier of the certain MBMS service, if the interest in receiving the MBMS service is changed or transmission on a certain MTCH (Multicast Traffic Channel) for providing the certain MBMS service is scheduled to stop.

The controller may activate a timer if the radio terminal starts receiving the certain MBMS service or receiving a certain potential MBMS service that can be possibly moved to the certain MBMS service. The controller may notify the MBMS interest indication including the identifier of the certain MBMS service if the timer expires.

The controller may notify the MBMS interest indication including the identifier of the certain MBMS service only if the notification of the MBMS interest indication is permitted by the network apparatus.

A network apparatus according to an embodiment may comprise: a controller configured to notify a radio terminal of a request for counting the number of radio terminals being receiving an MBMS (Multimedia Broadcast Multicast Service) service or being interested in receiving the MBMS service; and a receiver configured to receive a response to the request from the radio terminal. The controller may activate a timer after notifying the request. The controller may count the number of the response received before the timer expires.

The controller may notify an upper node of a result obtained by counting the number of the response, the upper node being configured to determine a start and an end of provision of the MBMS service.

A radio terminal according to an embodiment may comprise: a receiver configured to receive, from a network apparatus, a request for counting the number of radio terminals being receiving an MBMS (Multimedia Broadcast Multicast Service) service or being interested in receiving the MBMS service; and a controller configured to activate a timer in response to the reception of the request. The controller may notify the network apparatus of the response before the timer expires if being receiving the MBMS service or interested in receiving the MBMS service.

The request may include a predetermined value to be set as a value of the timer. The controller may set the predetermined value as the value of the timer.

The controller may set, as the value of the timer, a predefined value or a value received from a cell in which the radio terminal exists.

A radio terminal according to an embodiment may comprise: a receiver configured to receive control information transmitted via an MCH (Multicast Channel) from a network apparatus; and a controller configured to notify, if information indicating a request for counting the number of a certain radio terminal is included in the control information, the network apparatus of a response to the request. The certain radio terminal may be a radio terminal being receiving a certain MBMS (Multimedia Broadcast Multicast Service) service transmitted via a certain MTCH (Multicast Traffic Channel) or being interested in receiving the certain MBMS service.

The information indicating the request may be stored in a field in which information indicating that the transmission on the certain MTCH is scheduled to stop can be stored.

The controller may notify the network apparatus of the response only if the radio terminal is in an RRC idle state and is receiving the certain MBMS service or interested in receiving the certain MBMS service.

The receiver may receive, before receiving the control information, an MBMS counting request that can be received only in an RRC connected state. The controller may notify the network apparatus of the response, if there is a change in a reception state of the certain MBMS service or in the interest in receiving the certain MBMS service after notifying the network apparatus of an MBMS counting response for the certain MBMS service on a basis of the MBMS counting request. The MBMS counting request may be a request for counting the number of radio terminals being receiving the MBMS service or being interested in receiving the MBMS service. The MBMS counting response may be a response to the MBMS counting request.

The controller may include an identifier of the certain MBMS service, into the response to the request.

It should be noted that, in the specification of the present application, the following content is described.

A radio terminal according to an embodiment may include: a controller configured to hold user service description information on an MBMS service; and a receiver configured to receive system information (on a mobility procedure for receiving MBMS) transmitted over broadcast. The controller may update the user service description information, based on the system information.

The controller may start the operation if an identifier of the MBMS service included in the system information does not match an identifier of the MBMS service included in the user service description information.

[Overview of Mobile Communication System]

Hereinafter, overview of an LTE system being a mobile communication system according to an embodiment will be described.

(System Configuration)

Figure 2:
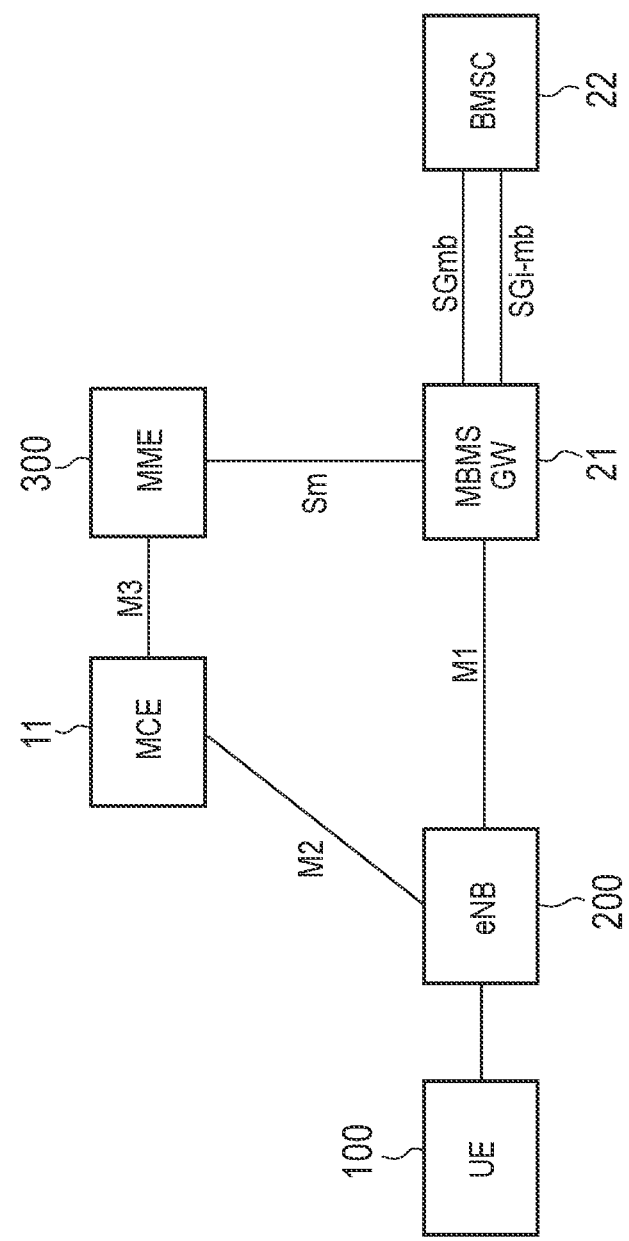
FIG. 2 is a diagram illustrating a network configuration for MBMS/eMBMS.

FIG. 1 is a diagram illustrating a configuration of an LTE system according to the embodiment. FIG. 2 is a diagram illustrating a network configuration for MBMS/eMBMS according to the embodiment.

As shown in FIG. 1, the LTE system comprises UEs (User Equipments) 100, E-UTRAN (Evolved Universal Terrestrial Radio Access Network) 10, and EPC (Evolved Packet Core) 20.

The UE 100 corresponds to a user terminal. The UE 100 is a mobile communication device. The UE 100 performs radio communication with a connected cell (a serving cell). Configuration of the UE 100 will be described later.

The E-UTRAN 10 corresponds to a radio access network. The E-UTRAN 10 includes eNBs 200 (evolved Node-Bs). The eNB 200 corresponds to a base station. The eNBs 200 are connected mutually via an X2 interface. Configuration of the eNB 200 will be described later.

The eNB 200 manages a cell or a plurality of cells and performs radio communication with the UE 100 that establishes a connection with the cell of the eNB 200. The eNB 200, for example, has a radio resource management (RRM) function, a function of routing user data (hereinafter, simply referred to as "data"), and a measurement control function for mobility control and scheduling. The "cell" is used as a term indicating a minimum unit of a radio communication area. It may be also used as a term indicating a function of performing radio communication with the UE 100.

The EPC 20 corresponds to a core network. The EPC 20 comprises MME (Mobility Management Entity)/S-GW (Serving-Gateway) 300. The MME performs various mobility controls and the like, for the UE 100. The S-GW performs control to transfer user data. The MME/S-GW 300 is connected to the eNB 200 via an S1 interface. The E-UTRAN 10 and the EPC 20 constitute a network of the LTE system.

In addition, the E-UTRAN 10 comprises an MCE (Multi-Cell/Multicast Coordinating Entity) 11. The MCE 11 is connected to the eNB 200 via the M2 interface and is connected to the MME 300 via the M3 interface (see FIG. 2). The MCE 11 performs MBSFN radio resource management and allocation and the like.

The EPC 20 comprises an MBMS GW (Multimedia Broadcast Multicast Service Gateway) 21. The MBMS GW 21 is connected to the eNB 200 via the M1 interface, connected to the MME 300 via the Sm interface, and connected to the BMSC 22 via the SG-mb and SGi-mb interfaces (see FIG. 2). The MBMS GW 21 performs IP multicast data transmission and session control to the eNB 200.

In addition, the EPC 20 comprises a BMSC (Broadcast Multicast Service Center) 22. The BMSC 22 is connected to the MBMS GW 21 via the SG-mb and SGi-mb interfaces, and is connected to the P-GW 23 via the SGi interface (see FIG. 2). The BMSC 22 mainly manages and allocates TMGI (Temporary Mobile Group Identity).

(Configuration of Radio Protocol)

Figure 3:
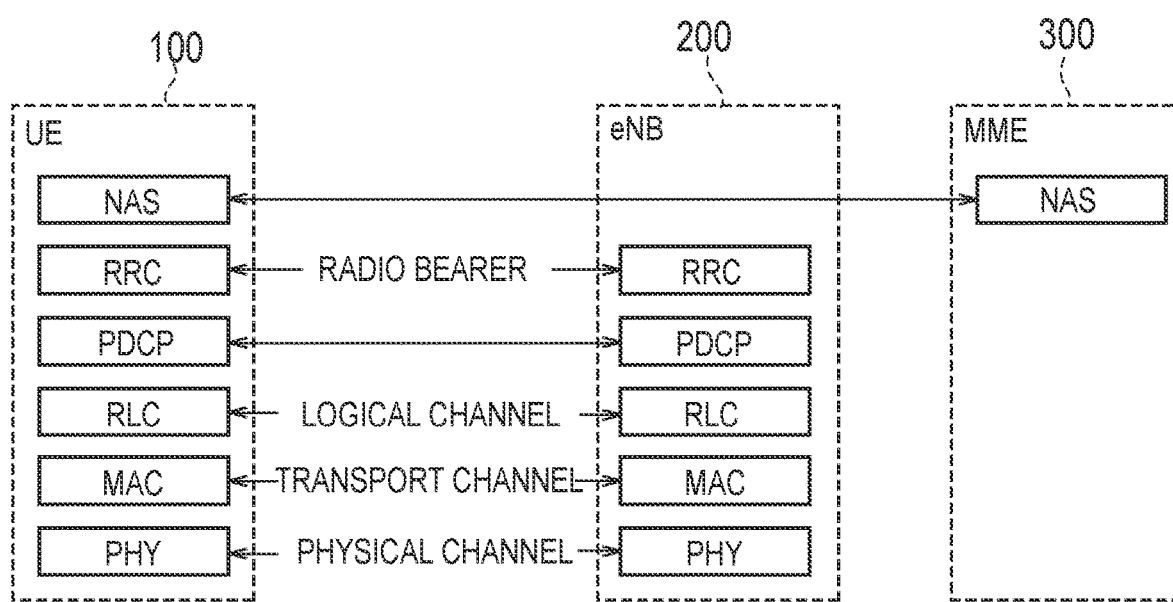
FIG. 3 is a protocol stack diagram of a radio interface in the LTE system.

FIG. 3 is a protocol stack diagram of a radio interface in the LTE system.

As shown in FIG. 3, the radio interface protocol is classified into a layer 1 to a layer 3 of an OSI reference model. The layer 1 is a physical (PHY) layer. The layer 2 includes MAC (Medium Access Control) layer, RLC (Radio Link Control) layer, and PDCP (Packet Data Convergence Protocol) layer. The layer 3 includes RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data and a control signal are transmitted through the physical channel.

The MAC layer performs priority control of data, a retransmission process by HARQ (Hybrid ARQ), a random access procedure, and the like. Between the MAC layer of the UE 100 and the MAC layer of the eNB 200, data and a control signal are transmitted via a transport channel. The MAC layer of the eNB 200 includes a scheduler. The scheduler decides a transport format of an uplink and a downlink (a transport block size, a modulation and coding scheme (MCS)) and an allocated resource block to the UE 100.

The RLC layer transmits data to an RLC layer of a reception side by using the functions of the MAC layer and the PHY layer. Between the RLC layer of the UE 100 and the RLC layer of the eNB 200, data and a control signal are transmitted via a logical channel.

The PDCP layer performs header compression and decompression, and encryption and decryption.

The RRC layer is defined only in a control plane handling a control signal. Between the RRC layer of the UE 100 and the RRC layer of the eNB 200, a message (an RRC message) for various types of setting is transmitted. The RRC layer controls the logical channel, the transport channel, and the physical channel in response to establishment, re-establishment, and release of a radio bearer. When a connection (an RRC connection) is established between the RRC of the UE 100 and the RRC of the eNB 200, the UE 100 is in an RRC connected state (an RRC connected mode). Otherwise, the UE 100 is in an RRC idle state (an RRC idle mode).

NAS (Non-Access Stratum) layer positioned above the RRC layer performs session management, mobility management and the like.

(Channel Configuration of Downlink)

FIG. 4 is a diagram illustrating a channel configuration of downlink in the LTE system.

Figure 4A:
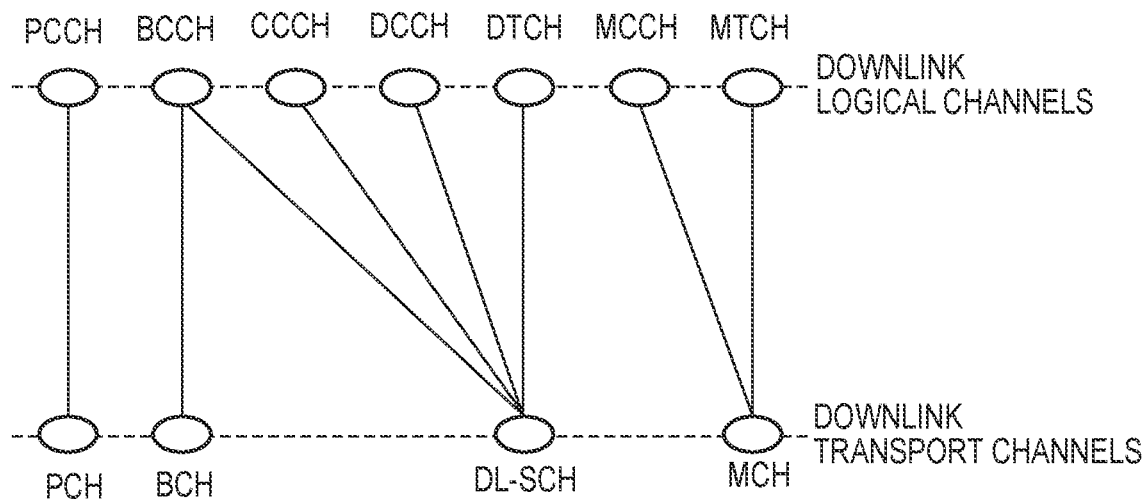
FIG. 4 is a diagram illustrating a channel configuration of downlink in the LTE system.

FIG. 4A illustrates mapping between a logical channel (Downlink Logical Channel) and a transport channel (Downlink Transport Channel).

As illustrated in FIG. 4A, PCCH (Paging Control Channel) is a logical channel for notifying paging information and a system information change. The PCCH is mapped to PCH (Paging Channel) that is the transport channel.

BCCH (Broadcast Control Channel) is a logical channel for broadcast system information. The BCCH is mapped to BCH (Broadcast Control Channel) that is the transport channel, or DL-SCH (Downlink Shared Channel).

CCCH (Common Control Channel) is a logical channel for transmission control information between the UE 100 and the eNB 200. The CCCH is used if the UE 100 has no RRC connection with the network. The CCCH is mapped to the DL-SCH.

DCCH (Dedicated Control Channel) is a logical channel for transmitting individual control information between the UE 100 and the network. The DCCH is used if the UE 100 has the RRC connection. The DCCH is mapped to the DL-SCH.

DTCH (Dedicated Traffic Channel) is an individual logical channel for transmitting data. The DTCH is mapped to the DL-SCH.

MCCH (Multicast Control Channel) is a logical channel for one-to-multi (multicast/broadcast) transmission. The MCCH is used for transmitting MBMS control information for MTCH from the network to the UE 100. The MCCH is used only for a UE 100 being receiving the MBMS or being interested in receiving the MBMS. The MCCH is mapped to MCH (Multicast Channel) that is a transport channel.

The MTCH (Multicast Traffic Channel) is a logical channel for one-to-multi (multicast/broadcast) data transmission from the network to the UE 100. The MTCH is used only for a UE 100 configured to receive the MBMS. The MTCH is mapped to the MCH.

Figure 4B:
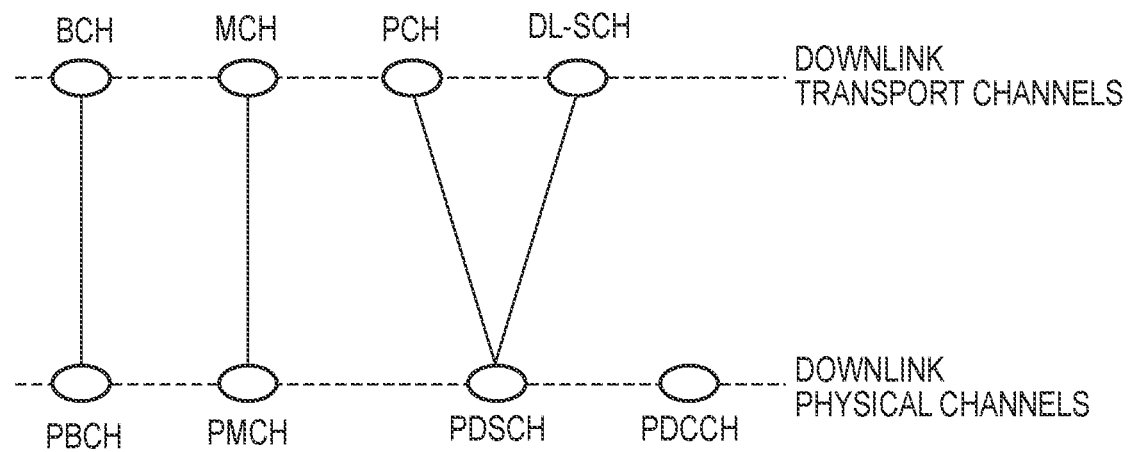

FIG. 4B illustrates mapping between a transport channel (Downlink Transport Channel) and a physical channel (Downlink Physical Channel).

As illustrated in FIG. 4B, the BCH is mapped to PBCH (Physical Broadcast channel).

The MCH is mapped to PMCH (Physical Multicast Channel). The MCH is broadcast to a whole coverage area of a cell. The MCH supports MBSFN transmission by a plurality of cells.

The PCH and the DL-SCH are mapped to PDSCH (Physical Downlink Shared Channel). The DL-SCH supports a HARQ, a link adaptation, and a dynamic resource allocation.

PDCCH carries resource allocation information of the PDSCH (the DL-SCH, the PCH), HARQ information on the DL-SCH, and the like. Furthermore, the PDCCH carries an uplink scheduling grant.

(Configuration of Radio Frame)

Figure 5:
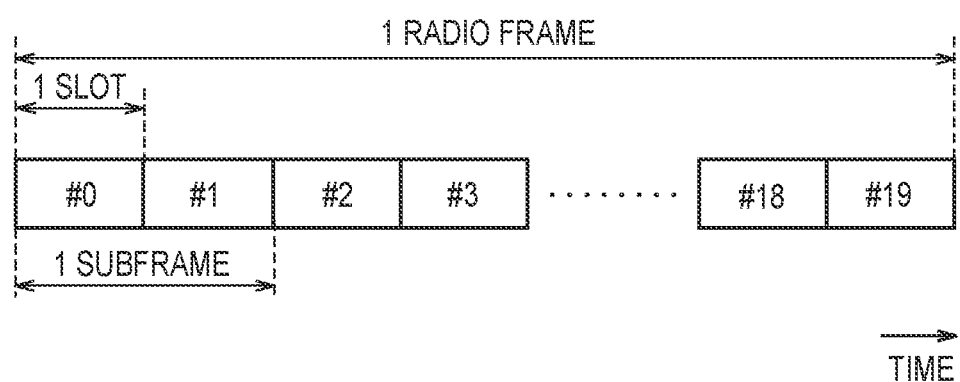
FIG. 5 is a configuration diagram of a radio frame used in the LTE system.

FIG. 5 is a configuration diagram of a radio frame used in the LTE system. In the LTE system, OFDMA (Orthogonal Frequency Division Multiplexing Access) is employed in a downlink (DL) and SC-FDMA (Single Carrier Frequency Division Multiple Access) is employed in an uplink (UL), respectively.

As shown in FIG. 5, the radio frame is configured by 10 subframes arranged in a time direction. Each subframe is configured by two slots arranged in the time direction. Each subframe has a length of 1 ms. Each slot has a length of 0.5 ms. Each subframe includes a plurality of resource blocks (RBs) in a frequency direction and a plurality of symbols in the time direction. Each resource block includes a plurality of subcarriers in the frequency direction. A resource element (RE) is configured by one symbol and one subcarrier. In addition, among radio resources (time-frequency resources) allocated to the UE 100, a frequency resource is specified by a resource block and a time resource is specified by a subframe (or slot).

In the downlink, an interval of several symbols at the head of each subframe is a region mainly used as a PDCCH for transmission of a downlink control signal. Furthermore, the remaining part of each subframe is a region which can be mainly used as a PDSCH for transmission of a downlink data. In addition, in the downlink, an MBSFN subframe being a subframe for MBSFN transmission may be set.

In the uplink, both end portions in the frequency direction of each subframe are regions mainly used as a PUCCH for transmission of an uplink control signal. Furthermore, the remaining part of each subframe is a region which can be mainly used as a PUSCH for transmission of an uplink data.

(Overview of MBMS)

An overview of MBMS will be described, below. The LTE system supports the MBMS (Multimedia Broadcast Multicast Service). In the MBMS, the UE 100 (an MBMS-compliant UE) receives a multimedia content (MBMS service) distributed over multicast or over broadcast from a network. The UE 100 can receive the MBMS data not only in the RRC connected state but also in the RRC idle state.

One MBSFN (Multicast-Broadcast Single-Frequency Network) area is configured by a plurality of cells, and an MBMS service area is configured by a plurality of MBSFN areas. One cell can belong to the plurality of MBSFN areas.

The BMSC 22 provides a function of distributing the MBMS data. The MBMS GW 21 broadcasts the MBMS data to each eNB 200. The MCE 11 controls a radio resource used by each eNB 200 within the same MBSFN area or sets an MBSFN subframe, for example.

Furthermore, in order that the network can grasp a demand status for the MBMS service, an MBMS counting procedure has been introduced for counting the number of UEs 100 being receiving or interested in receiving the MBMS service (see Non Patent Document 1).

According to the MBMS counting procedure, the UE 100 in the RRC connected state (hereinafter, called an "RRC connected UE") transmits, to the network, an MBMS counting response in response to reception of an MBMS counting request.

It is noted that, according to the current specifications, the MBMS counting procedure is applied to the RRC connected UE, but is not applied to the UE 100 in the RRC idle state (hereinafter, called "RRC idle UE").

Furthermore, in the 3GPP, introduction of MooD (MBMS operation on Demand) has been discussed in which switching between a state where the content is distributed over multicast (MBMS ON), and a state where the content is distributed over unicast (MBMS OFF) is determined by a core network (EPC 20). Specifically, in the MooD, the BMSC 22 determines the switching between the "MBMS ON" and the "MBMS OFF". That is, the BMSC 22 determines a start and an end of provision of the MBMS service.

Here, in order that the BMSC 22 appropriately switches between the start and the end of the provision of the MBMS service, it is necessary to grasp the demand status of the content that is provided or may be provided in the MBMS service. However, a method of grasping, by the BMSC 22, the demand status of the content has not been specified in details.

Therefore, according to a method described below, the BMSC 22 can appropriately grasp the demand status of the content.

(Configuration of Radio Terminal)

Figure 6:
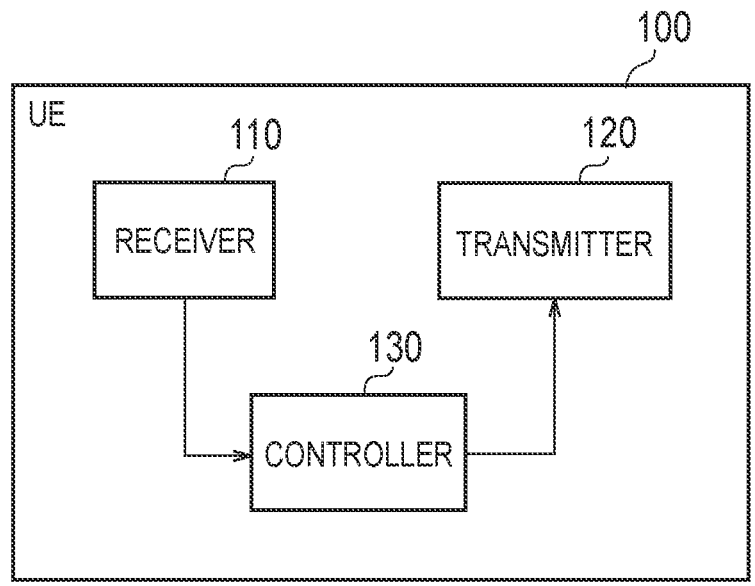
FIG. 6 is a block diagram of a UE 100 (user terminal).

FIG. 6 is a block diagram of the UE 100 (user terminal) according to the embodiment.

As illustrated in FIG. 6, the UE 100 comprises a receiver 110, a transmitter 120, and a controller 130.

The receiver 110 performs various types of reception under the control of the controller 130. The receiver 110 comprises an antenna and a receiving device. The receiving device converts a radio signal received by the antenna, into a baseband signal (reception signal), and outputs the baseband signal to the controller 130.

The transmitter 120 performs various types of transmission under the control of the controller 130. The transmitter 120 comprises an antenna and a transmission device. The transmission device converts a baseband signal (transmission signal) output by the controller 130, into a radio signal, and transmits the radio signal from the antenna.

The controller 130 performs various types of control in the UE 100. The controller 130 comprises a processor and a memory. The memory stores a program to be executed by the processor, and information to be used in processing performed by the processor. The processor comprises a baseband processor that performs modulation/demodulation and encoding/decoding of a baseband signal, and the like, and a central processing unit (CPU) that executes programs stored in the memory, to perform various types of processing. The processor may comprise a codec that performs encoding/decoding of an audio/video signal. The processor executes various types of communication protocols mentioned above and various types of processing to be described later.

(Configuration of Base Station)

Figure 7:
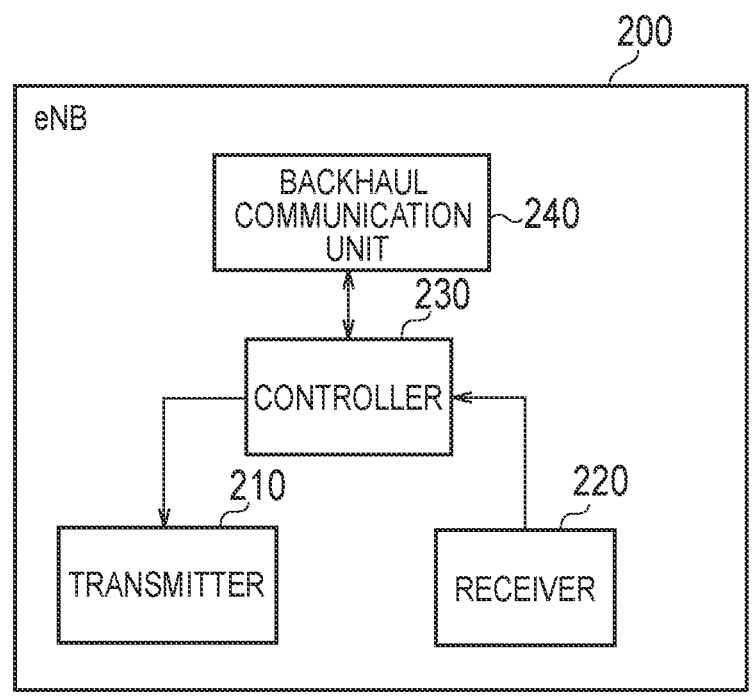
FIG. 7 is a block diagram of an eNB 200 (base station).

FIG. 7 is a block diagram of the eNB 200 (base station) according to the embodiment.

As illustrated in FIG. 6, the eNB 200 comprises a transmitter 210, a receiver 220, a controller 230, and a backhaul communication unit 240.

The transmitter 210 performs various types of transmission under the control of the controller 230. The transmitter 210 comprises an antenna and a transmission device. The transmission device converts a baseband signal (transmission signal) output by the controller 230, into a radio signal, and transmits the radio signal from the antenna.

The receiver 220 performs various types of reception under the control of the controller 230. The receiver 220 comprises an antenna and a receiving device. The receiving device converts a radio signal received by the antenna, into a baseband signal (reception signal), and outputs the baseband signal to the controller 230.

The controller 230 performs various types of control in the eNB 200. The controller 230 comprises a processor and a memory. The memory stores a program to be executed by the processor, and information to be used in processing performed by the processor. The processor comprises a baseband processor that performs modulation/demodulation and encoding/decoding of a baseband signal, and the like, and a central processing unit (CPU) that executes programs stored in the memory, to perform various types of processing. The processor executes various types of communication protocols mentioned above and various types of processing to be described later.

The backhaul communication unit 240 is connected to a neighboring eNB 200 via an X2 interface. The backhaul communication unit 240 is connected to a MME/S-GW 300 via an S1 interface. The backhaul communication unit 240 is used for communication performed on the X2 interface, communication performed on the S1 interface, and the like.

(Configuration of Network Apparatus)

Figure 8:
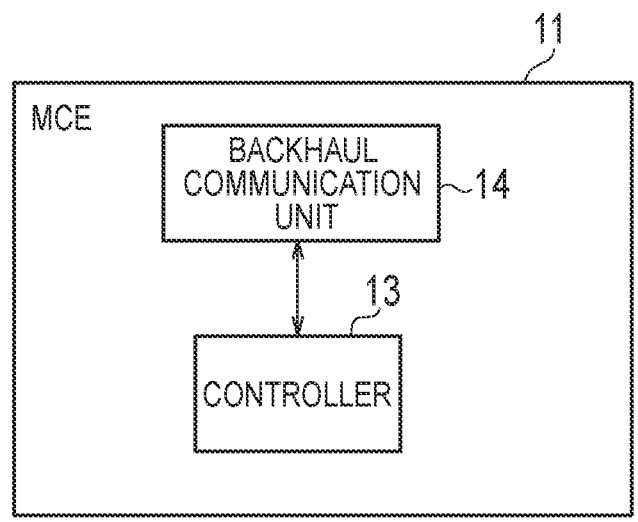
FIG. 8 is a block diagram of a network apparatus (MCE 11 and BMSC 22).

FIG. 8 is a block diagram of the MCE 11 (network apparatus) according to an embodiment.

As illustrated in FIG. 8, the MCE 11 includes: a controller 13 and a backhaul communication unit 14.

The controller 13 performs various types of controls in the MCE 11. The controller 13 includes a processor and a memory. The memory stores a program to be executed by the processor, and information to be utilized for a processing by the processor. The processor includes a CPU (Central Processing Unit) configured to execute a program stored in the memory to perform various types of processes. The processor executes various types of processes described later, and various types of communication protocols described above.

The backhaul communication unit 14 is connected to the eNB 200 via the M2 interface and to the MME 300 via the M3 interface. The backhaul communication unit 14 is used for communication performed on the M2 interface, communication performed on the M3 interface, and the like.

It is noted that the BMSC 22 includes a similar configuration to the MCE 11. That is, the BMSC 22 includes the controller and the backhaul communication unit.

First Embodiment

Hereinafter, a first embodiment will be described. In the first embodiment, an operation of acquiring, by the BMSC 22, information for grasping the demand status of the content will be mainly described. Specifically, the operation includes an operation of a network trigger (operation examples 1 to 3) and an operation of a UE trigger (operation example 4). It is noted that a duplicated description in each operation example will be omitted where appropriate.

(1) Operation Example 1

Figure 9:
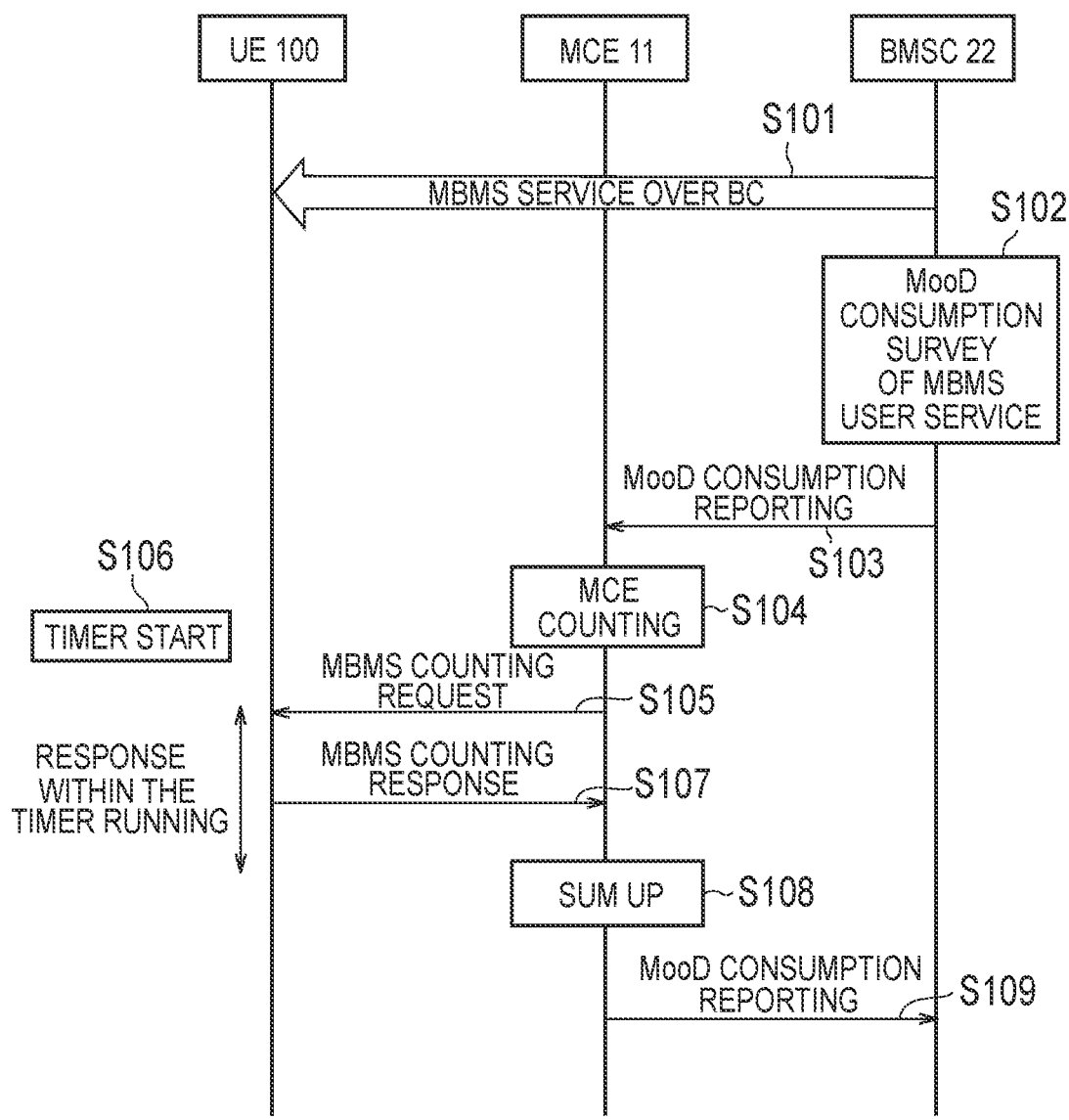
FIG. 9 is a sequence chart for describing an operation example 1 according to a first embodiment.

By using FIG. 9, the operation example 1 will be described. FIG. 9 is a sequence diagram for describing the operation example 1 according to the first embodiment. In an initial state of FIG. 9, the UE 100 is in the RRC connected state. Alternatively, the UE 100 may be in the RRC idle state.

As illustrated in FIG. 9, in step S101, the BMSC 22 provides the MBMS service over broadcast (or over multicast). The UE 100 receives the MBMS service.

In step S102, the BMSC 22 starts executing a MooD consumption survey of the MBMS service (MBMS user service). Specifically, the BMSC 22 starts a process of step S103.

In step S103, the BMSC 22 notifies the MCE 11 of a MooD consumption reporting request. The MCE 11 receives the MooD consumption reporting request. The MooD consumption reporting request may include each predetermined value to be set as a value of a first timer and/or a value of a second timer, described below.

In step S104, the MCE 11 starts executing an MCE counting. Specifically, the MCE 11 starts a process of step S105, in response to the reception of the MooD consumption reporting request.

In step S105, the MCE 11 notifies the UE 100 of the MBMS counting request. The MBMS counting request is a request for counting the number of UEs being receiving or interested in receiving the MBMS service. The MBMS counting request may include a predetermined value to be set as the value of the second timer, described below.

The UE 100 receives the MBMS counting request. The UE 100 transitions to the RRC connected state at least before the MBMS counting request is transmitted.

The MCE 11 activates the first timer configured to measure a period during which transmission of the MBMS counting response is permitted, after notifying the MBMS counting request. The MCE 11 does not notify the BMSC 22 of a MooD consumption reporting described below before the first timer expires. The first timer may be a count-down-type timer or a count-up-type timer.

The MCE 11 sets a predetermined value as the value of the first timer if the MooD consumption reporting request includes the predetermined value to be set as the value of the first timer. If the first timer is the count-down-type timer, a count down is started from the predetermined value and the first timer expires at "0". If the first timer is the count-up-type timer, a count up is started from "0" and the first timer expires at a predetermined value. It is noted that a timer described below may be similar in configuration to the first timer.

In step S106, the UE 100 activates the second timer configured to measure a period during which the transmission of the MBMS counting response is permitted, in response to the reception of the MBMS counting request.

The UE 100 can set a predefined value as the value of the second timer. Alternatively, the UE 100 can set a value received from a cell in which the UE 100 exists, as the value of the second timer. In this case, the value received from the cell may be included in a system information block (SIB 15, for example) and may be included in an RRC (re)configuration message. The UE 100 sets a predetermined value as the value of the second timer if the MBMS counting request includes the predetermined value to be set as the value of the second timer. It is noted that the setting value of the second timer may be the same in value as the setting value of the first timer. Alternatively, the setting value of the second timer may be smaller in value than the setting value of the first timer.

In step S107, the UE 100 notifies the MCE 11 of the MBMS counting response before the second timer expires. The MBMS counting response is a response to the MBMS counting request. The MCE 11 receives the MBMS counting response.

The UE 100 notifies the MCE 11 of the MBMS counting response if being receiving or interested in receiving the MBMS service. The UE 100 may notify the MCE 11 of the MBMS counting response if actually consuming the MBMS service (MBMS user service).

Unlike in the conventional MBMS counting procedure, the UE 100 may not need to notify the MBMS counting response, in response to the reception of the MBMS counting request (that is, immediately after receiving the MBMS counting request). The UE 100 may notify the MBMS counting response at any timing if the second timer is before expiration. For example, the UE 100 may preferentially transmit other information (control information and data information) depending on a buffer status of the UE 100 if the second timer is before expiration. The UE 100 can transmit the MBMS counting response after transmitting the other information.

In step S108, the MCE 11 counts the MBMS counting response. Specifically, the MCE 11 performs counting for the MBMS counting response received before the first timer expires. As a result, the MCE 11 can include, not only the MBMS counting response transmitted immediately after receiving the MBMS counting request but also the MBMS counting response transmitted before the second timer expires to perform the counting. Consequently, the MCE 11 can accurately understand a counting result of the MBMS counting response.

The MCE 11 can start the conventional MBMS counting procedure, based on determination of the MCE 11. In the conventional MBMS counting procedure, the UE 100 transmits the MBMS counting response in response to the reception of the MBMS counting request. Thus, when the MBMS counting procedure is started, a traffic load of the E-UTRAN 10 increases. Therefore, if there occurs congestion in the E-UTRAN 10, for example, the MCE 11 can avoid the start of the MBMS counting procedure.

On the other hand, as described above, the MCE 11 is highly likely to (forcibly) start the MBMS counting procedure if receiving the MooD consumption reporting request. Thus, when the above-described first timer and second timer are utilized, it is possible to alleviate the increase of the traffic load of the E-UTRAN 10 caused by the start of the MBMS counting procedure.

In step S109, the MCE 11 notifies the BMSC 22 of the MooD consumption reporting after the first timer expires. The MooD consumption reporting is a response to the MooD consumption reporting request. The MooD consumption reporting includes a counting result of the MBMS counting response. The BMSC 22 receives the MooD consumption reporting. The MooD consumption reporting is information for the BMSC 22 to grasp the demand status of the content.

The BMSC 22 determines the start or the end of the provision of the MBMS service depending on the counting result of the MBMS counting response. In the operation example 1, the BMSC 22 provides the MBMS service, and thus determines whether to end the provision of the MBMS service. That is, the BMSC 22 determines whether to switch from the "MBMS ON" to the "MBMS OFF". For example, the BMSC 22 determines to switch to the "MBMS OFF" if a total value of the MBMS counting response is less than a threshold value. The BMSC 22 starts an operation for notifying the UE 100 of the end of the MBMS transmission if determining to switch to the "MBMS OFF".

It is noted that if notifying the UE 100 of a content distributable over multicast or over broadcast (potential MBMS user service), the BMSC 22 determines to start the provision of the MBMS service depending on the counting result of the MBMS counting response to the distributable content. That is, the BMSC 22 determines whether to switch from the "MBMS OFF" to the "MBMS ON". For example, the BMSC 22 determines to switch to the "MBMS ON" if the total value of the MBMS counting response is equal to or more than a threshold value. If determining to switch to the "MBMS ON", the BMSC 22 starts the operation for notifying the UE 100 of the start of the MBMS transmission for the content distributable over multicast or over broadcast.

(2) Operation Example 2

Figure 10:
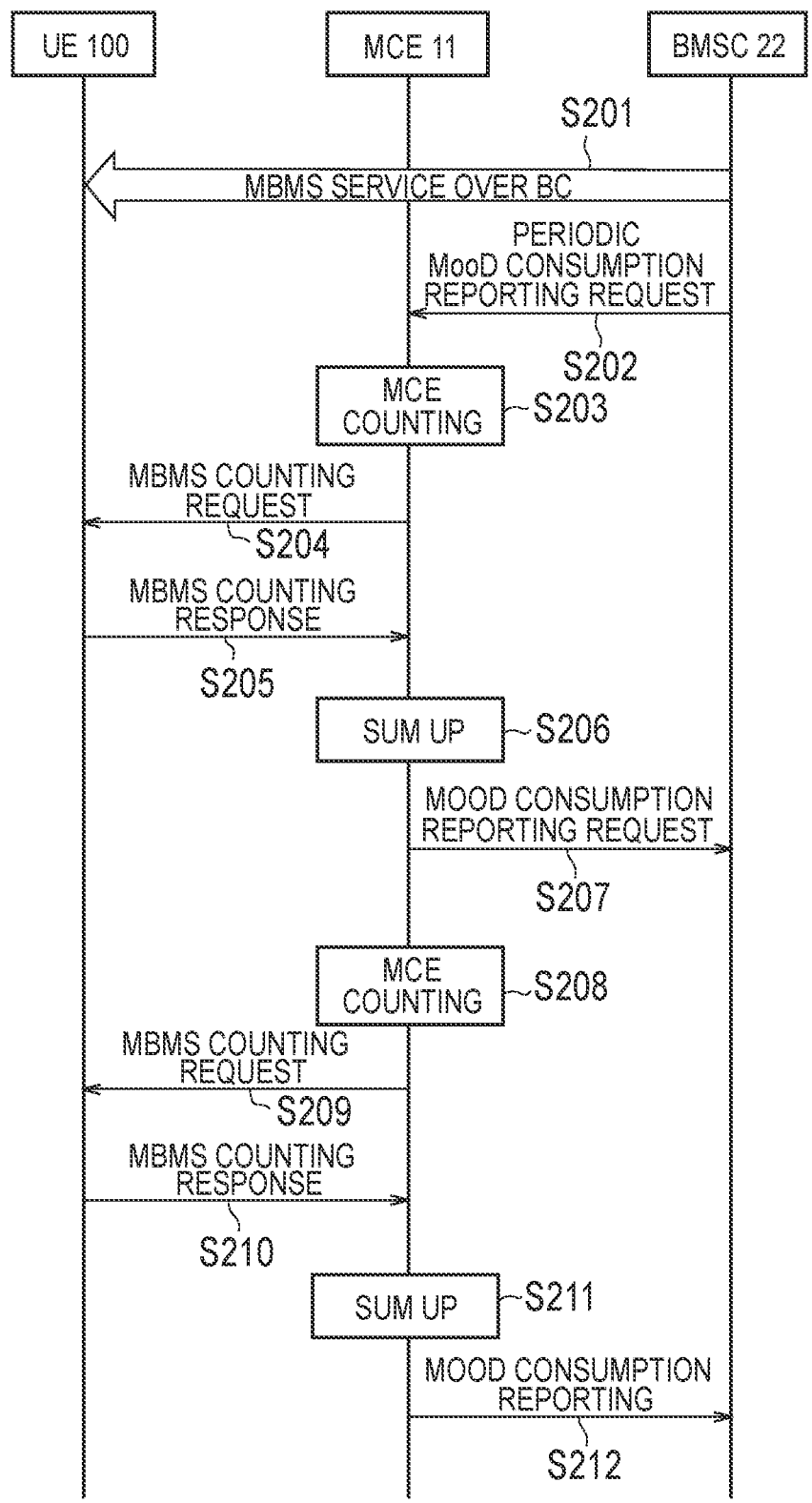
FIG. 10 is a sequence chart for describing an operation example 2 according to the first embodiment.

By using FIG. 10, the operation example 2 will be described. FIG. 10 is a sequence chart for describing the operation example 2 according to the first embodiment. In the operation example 2, the MCE 11 periodically notifies the MCE 11 of the MooD consumption reporting.

In FIG. 10, step S201 corresponds to step S101.

In step S202, a periodic MooD consumption reporting request is notified to the MCE 11. The MCE 11 receives the periodic MooD consumption reporting request. The periodic MooD consumption reporting request may include information indicating a number of times that the MooD consumption reporting occurs. The periodic MooD consumption reporting request may further include information indicating a period (once in one minute, for example) of the MooD consumption reporting. The MCE 11 may determine, based on the information indicating the period of the MooD consumption reporting, a predetermined value to be set as the value of the first timer and/or the second timer.

Steps S203 to S207 correspond to steps S104, S105, and S107 to S109. It is noted that the MCE 11 may utilize the first timer. The UE 100 may utilize the second timer.

In step S208, the MCE 11 starts again executing the MCE counting. The MCE 11 starts executing the MCE counting even if not receiving the MooD consumption reporting request.

Steps S209 to S212 correspond to steps S105 and S107 to S109.

The MCE 11 can start executing the MCE counting after performing the MooD consumption reporting. The MCE 11 may end the execution of a periodic MCE counting after notifying the MooD consumption reporting a predetermined number of times, based on the information indicating the number of times that the MooD consumption reporting occurs. Alternatively, the MCE 11 may end the execution of the periodic MCE counting if receiving a notification for ending the periodic MCE counting.

The BMSC 22 can periodically receive the MBMS counting response, so that the BMSC 22 appropriately can grasp the demand status of the content. Furthermore, the BMSC 22 is not required to notify the MooD consumption reporting request every time, so that the signaling can be reduced.

(3) Operation Example 3

By using FIG. 11, the operation example 3 will be described. FIG. 11 is a sequence chart for describing the operation example 3 according to the first embodiment. The operation example 3 is an operation example for grasping the demand status of the content at least in the RRC idle UE.

In an initial state of FIG. 11, the UE 100 is in the RRC idle state. The UE 100 may be in the RRC connected state.

It is noted that the operation example 3 may be performed after the operation example 1 or the operation example 2 is performed. It is noted that, in the operation example 3, similarly to the operation example 1, the first timer and the second timer may be used. Furthermore, in the operation example 1 or the operation example 2 before the operation example 3 is performed, the first timer and the second timer may not be used.

As illustrated in FIG. 11, in step S301, the BMSC 22 starts executing the MooD consumption survey of the MBMS service (MBMS user service) for an RRC idle UE. Specifically, the BMSC 22 starts a process of step S103. The BMSC 22 may include an RRC connected UE as a UE to be surveyed.

The BMSC 22 may start executing the MooD consumption survey, based on the MooD consumption reporting in the operation example 1 or the operation example 2. For example, if a total value of the MBMS counting response is less than a threshold value, the BMSC 22 may start executing the MooD consumption survey to grasp the demand status of an RRC idle UE for a certain content.

In step S302, the BMSC 22 notifies the MCE 11 of the MooD consumption reporting request for the RRC idle UE (hereinafter, called "second MooD consumption reporting request"). The MCE 11 receives the second MooD consumption reporting request.

The second MooD consumption reporting request may request the MooD consumption reporting for the certain content. The second MooD Consumption Reporting request may include an identifier associated with the certain content an identifier of the MBMS service, for example (TMGI: Temporary Mobile Group Identity). The second MooD consumption reporting request may include each predetermined value to be set as the value of the first timer and/or the value of the second timer.

In step S303, the MCE 11 starts executing an enhanced MCE counting. Specifically, the MCE 11 starts a process of step S304, in response to the reception of the second MooD consumption reporting request.

In step S304, the MCE 11 notifies the UE 100 of an enhanced MBMS counting request. The enhanced MBMS counting request is information indicating a request for counting the number of a certain radio terminal (hereinafter, "request information"). The certain radio terminal is a radio terminal being receiving a certain MBMS service (certain content) transmitted via a certain MTCH, or a radio terminal being interested in receiving a certain MBMS service (certain content). The request information is included in control information transmitted via a certain MCH. For example, the request information is included in an "MCH Scheduling Information Mac control element". Alternatively, the request information may be included in an "Extended MCH Scheduling Information Mac control element".

Furthermore, the enhanced MBMS counting request may include a predetermined value to be set as the value of the second timer.

It is noted that the "Extended MCH Scheduling Information Mac control element" is included in a first subframe assigned to the corresponding MCH (certain MCH), in an MCH scheduling period. The "Extended MCH Scheduling Information Mac control element" indicates a location of each MTCH and a location not in use on the MCH. Furthermore, the "Extended MCH Scheduling Information Mac control element" can indicate whether the MTCH transmission stops. The "Extended MCH Scheduling Information Mac control element" includes an LCID field and an S field. The LCID field stores therein a logical channel ID of the MTCH (LCID). The S field can store therein information ("000") indicating the transmission on the MTCH corresponding to the LCID is scheduled to stop.

If a predetermined value other than "000" ("111", for example) is stored (set) in the S field in the received "Extended MCH Scheduling Information Mac control element", the UE 100 determines that the control information ("Extended MCH Scheduling Information Mac control element") includes the request information.

It is noted that if the request information is included in the S field, the UE 100 may determine that the transmission on the corresponding MTCH is scheduled to stop irrespective of "000" being set in the S field.

It is noted that the UE 100 sets a predetermined value as the value of the second timer if the enhanced MBMS counting request includes the predetermined value to be set as the value of the second timer. Thereafter, the UE 100 activates the second timer, and executes a process of step S305 before the second timer expires.

In step S305, the UE 100 notifies the MCE 11 of an enhanced MBMS counting response. The enhanced MBMS counting response is a response to the enhanced MBMS counting request. The MCE 11 receives the enhanced MBMS counting response.

The UE 100 notifies the MCE 11 of the enhanced MBMS counting response if being receiving or interested in receiving the certain MBMS service. The UE 100 may notify the MCE 11 of the enhanced MBMS counting response if actually consuming the certain MBMS service (certain MBMS user service). The UE 100 may notify the MCE 11 of the enhanced MBMS counting response if wishing to continuously receive the certain MBMS service transmitted via the certain MTCH. Alternatively, the UE 100 may notify the MCE 11 of the enhanced MBMS counting response if it is not scheduled to be in the RRC connected state (while the certain MBMS service is continued).

The UE 100 may notify the MCE 11 of the enhanced MBMS counting response only if being in the RRC idle state, and being receiving or interested in receiving the certain MBMS service. That is, the enhanced MBMS counting response may be notified by the RRC idle UE only. Alternatively, the enhanced MBMS counting response may be notified by not only the RRC idle UE but also by the RRC connected UE.

The RRC connected UE may omit transmission of the enhanced MBMS counting response if notifying the MBMS counting response in the above-described operation example 1 or 2. Alternatively, the RRC connected UE may notify, the MCE 11 of the enhanced MBMS counting response, (only) if there is a change in a reception state of the certain MBMS service or in the interest in receiving the certain MBMS service after notifying the MCE 11 of the MBMS counting response about the certain MBMS service on the basis of the MBMS counting request.

The UE 100 may include an identifier of the certain MBMS service, into the enhanced MBMS counting response. The identifier of the certain MBMS service is the TMGI, for example. Alternatively, the identifier of the certain MBMS service may be an identifier (such as a program ID) made to correspond to the MBMS service (program) on a one-to-one basis. Alternatively, the identifier of the certain MBMS service may be information other than information indicating a frequency for identifying the certain MBMS service. Furthermore, the UE 100 may include information (flag information (0/1), for example) indicating whether being in the RRC idle state or in the RRC connected state.

It is noted that similarly to the operation example 1, if the first timer and the second timer are used, the UE 100 can notify the enhanced MBMS counting response before the second timer expires. If transitioning to an RRC connected state before the second timer expires with a purpose other than notifying the enhanced MBMS counting response, the RRC idle UE can incidentally notify the enhanced MBMS counting response. Thus, the power consumption can be suppressed compared to a case where the RRC idle UE notifies the enhanced MBMS counting response immediately after receiving the enhanced MBMS counting request. Furthermore, the UE 100 may execute the operation similar to the operation example 4 described later.

Steps S306 and S307 correspond to steps S108 and S109. It is noted that the MCE 11 may count the number of enhanced MBMS counting responses for each certain MBMS service. Alternatively, the MCE 11 may count the number of the enhanced MBMS counting responses from the RRC idle UE, and the number of the enhanced MBMS counting responses from the RRC connected UE, respectively.

It is noted that the BMSC 22 may determine, depending on the counting result of the MBMS counting response, the start or the end of the provision of the MBMS service, only if the MooD consumption reporting in the operation example 3 is received. That is, the BMSC 22 may determine the start or the end of the provision of the MBMS service, only if grasping the demand status of the content in the RRC idle UE (and RRC connected UE), instead of determining the start or the end of the provision of the MBMS service, based on the demand status of the content only in the RRC connected UE.

As described above, the BMSC 22 (and MCE 11) can grasp not only the demand status of the content in the RRC connected UE but also the demand status of the content in the RRC idle UE.

(4) Operation Example 4

By using FIG. 12 to FIG. 14, an operation example 4 will be described. FIG. 12 is a sequence chart for describing the operation example 4 according to the first embodiment. FIG. 13 is a flowchart (part 1) for describing the operation example 4 according to the first embodiment. FIG. 14 is a flowchart (part 2) for describing the operation example 4 according to the first embodiment. In the operation example 4, the UE 100 autonomously notifies the network apparatus (eNB 200, MCE 11, and BMSC 22) of an indication for the certain MBMS service.

As illustrated in FIG. 12, in step S401, the BMSC 22 provides a potential MBMS user service to the UE 100 over unicast. The potential MBMS user service is a non-MBMS user service that is potentially possible to transition to the MBMS user service. The potential MBMS user service is a content that can be provided over multicast or over broadcast.

In step S402, the UE 100 detects that an interest in the MBMS service (including potential MBMS user service) has been changed. If starting the reception of the certain MBMS service, the UE 100 detects that the interest in the MBMS service has been changed. If starting the reception of the provision of the certain potential MBMS user service, the UE 100 determines that it is interested in the MBMS service distributed over multicast or over broadcast, and detects that the interest in the MBMS service has been changed.

It is noted that the UE 100 may omit a process of step S403 and execute a process of step S404.

In step S403, the UE 100 activates the third timer if starting the reception of the certain MBMS service or the reception of the certain potential MBMS user service. The third timer is a timer for measuring a period during which a notification of an enhanced interest indication described later is prohibited.

The UE 100 can set a predefined value as a value of the third timer. Alternatively, the UE 100 can set a value received from a cell in which the UE 100 exists as the value of the third timer. In this case, the value received from the cell may be included in a system information block (SIB 15, for example) and may be included in an RRC (re)configuration message.

The UE 100 notifies the network apparatus of the enhanced interest indication after the third timer expires. That is, the UE 100 executes the process of step S404 after the third timer expires. As a result, the notification of the enhanced interest indication each time the UE 100 starts the reception of the certain MBMS service can be suppressed. The frequent notification of the enhanced interest indication from the UE 100 to the network apparatus can be reduced.

In step S404, the UE 100 notifies the network apparatus of the enhanced interest indication. The UE 100 notifies at least any one of the eNB 200, the MCE 11, and BMSC 22 of the enhanced interest indication. If being in the RRC idle state, the UE 100 notifies the enhanced interest indication after transitioning to the RRC connected state.

The UE 100 notifies the MBMS interest indication for announcing that the UE 100 is receiving the MBMS service or is interested in receiving the MBMS service as the enhanced interest indication. Here, the UE 100 includes the TMGI into the MBMS interest indication. This TMGI is an identifier of the certain MBMS service which the UE 100 being receiving or interested in receiving. It is noted that the conventional MBMS interest indication does not include the TMGI.

If the interest in the MBMS service is changed (if detecting the change in interest in MBMS service), the UE 100 notifies the enhanced interest indication including the TMGI. By using FIG. 13, an example of an operation for determining whether or not the UE 100 notifies (transmits) the enhanced interest indication will be described.

As illustrated in FIG. 13, in step S510, the UE 100 starts the third timer.

In step S520, if the received MBMS service is changed (Yes) after the UE 100 starts the third timer, the UE 100 ends the process. That is, the UE 100 ends the process if the MBMS service before starting the third timer and the MBMS service after starting the third timer differ. As a result, if the received MBMS service is changed, the UE 100 cannot immediately notify the enhanced interest indication. After ending the process, the UE 100 can start the present operation (step S510). On the other hand, if the received MBMS service is not changed (No), the UE 100 executes a process of step S530. That is, if the MBMS service before starting the third timer and the MBMS service after starting the third timer match, the UE 100 executes the process of step S530.

In step S530, the UE 100 executes a process of step S540 if the third timer expires (Yes). The UE 100 executes a process of step S520 if the third timer does not expire (No). It is noted that, in the step S520 executed after step S530, the process of step S530 is executed if the received MBMS service remains changed or if receiving a new MBMS service.

In step S540, the UE 100 notifies the enhanced interest indication (response report).

In this manner, if the interest in the MBMS service is changed, the UE 100 notifies the enhanced interest indication including the TMGI.

Alternatively, if the transmission on the certain MTCH used for providing the certain MBMS service is scheduled to stop when receiving the MBMS service, the UE 100 may notify the enhanced interest indication including the TMGI. It is noted that if receiving the "Extended MCH Scheduling Information Mac control element" including the S field set to the "000", the UE 100 determines that the transmission on the certain MTCH is scheduled to stop.

If the third timer is activated and (only) if the third timer expires, the UE 100 may notify the enhanced interest indication including the TMGI. Alternatively, the UE 100 may notify the enhanced interest indication including the TMGI, while the serving cell (PCell) in which the UE 100 exists is providing the system information (SIB 15) related to the mobility procedure for receiving the MBMS transmitted over broadcast.

Furthermore, (only) if the notification of the enhanced interest indication including the TMGI is permitted by the network apparatus, the UE 100 may notify the enhanced interest indication including the TMGI. By using FIG. 14, an example of an operation for determining whether or not the UE 100 transmits the enhanced interest indication will be described.

As illustrated in FIG. 14, in step S501, the UE 100 determines whether or not the notification of the enhanced interest indication including the TMGI is permitted by the network apparatus. For example, the UE 100 determines, if receiving a request for the enhanced interest indication from the network apparatus, that the notification of the enhanced interest indication including the TMGI is permitted by the network apparatus.

The UE 100 executes a process of step S510 if the notification of the enhanced interest indication including the TMGI is permitted by the network apparatus (Yes). The operations hereinafter are the same as the operations described above. On the other hand, the UE 100 ends the process if the notification of the enhanced interest indication including the TMGI is not permitted by the network apparatus (No).

In this manner, the UE 100 can notify the enhanced interest indication if the notification of the enhanced interest indication including the TMGI is permitted by the network apparatus. In this case, it is possible for the network apparatus to randomize the transmission of the enhanced interest indication. Thus, a simultaneous transmission of the enhanced interest indication when starting the provision of the MBMS service can be suppressed. Furthermore, the network apparatus can control, by a request for the enhanced interest indication, a switch between the conventional MBMS interest indication and the enhanced interest indication. That is, if the notification of the enhanced interest indication is not permitted by the network apparatus, the UE 100 notifies the conventional MBMS interest indication; if the notification of the enhanced interest indication is permitted by the network apparatus, the UE 100 notifies the enhanced interest indication instead of the conventional MBMS interest indication.

It is noted that if the enhanced interest indication is notified, the UE 100 may activate a fourth timer for measuring a period during which the notification of the enhanced interest indication is prohibited. The UE 100 may notify the enhanced interest indication after the fourth timer expires.

The network apparatus which has received the enhanced interest indication counts the number of the enhanced interest indication. The network apparatus may count the number of enhanced interest indications for each certain MBMS service, based on the TMGI included in the enhanced interest indication. The network apparatus holds the number of UEs for each certain MBMS service.

It is noted that the conventional MBMS interest indication is used for determining a cell in which the UE 100 exists, and not used for grasping the demand status of the content. Therefore, the network apparatus does not count the number of the conventional interest indications according to the specifications.

If the eNB 200 counts the number of the enhanced interest indication, the eNB 200 can notify at least one of the MCE 11 and the BMSC 22 of the MooD consumption reporting including the counting result. The eNB 200 may notify the MooD consumption reporting, in response to the request of the MCE 11 or the BMSC 22. Furthermore, if the MCE 11 counts the number of the enhanced interest indication, the MCE 11 can notify the BMSC 22 of the MooD consumption reporting including the counting result. The MCE 11 may notify the MooD consumption reporting, in response to the request of the BMSC 22.

It is noted that if the UE 100 loses interest in the certain MBMS service notified by a last enhanced interest indication, the UE 100 can notify the network apparatus of the loss of interest in the MBMS service by the enhanced interest indication.

Second Embodiment

Hereinafter, a second embodiment will be described by using FIG. 15. FIG. 15 is a sequence chart for describing an operation according to the second embodiment.

In the MooD, the BMSC 22 determines a switch between the "MBMS ON" and the "MBMS OFF". If the BMSC 22 determines to switch to the "MBMS OFF", that is, if providing the content over unicast, information corresponding to the content (TMGI, for example) is removed from a USD (User Service Description) that is user service description information. On the other hand, if the BMSC 22 determines to switch to the "MBMS ON", that is, if providing the content over multicast, the information corresponding to the content (TMGI, for example) is added to the USD (User Service Description) that is the user service description information.

In this manner, the BMSC 22 is assumed to dynamically update the USD. However, because not establishing the RRC connection with the network, the RRC idle UE may not know that the USD has been updated. Therefore, the RRC idle UE can know that the USD has been updated by the following method.

In step S601, the BMSC 22 notifies the UE 100 of the USD. Here, a description proceeds with an assumption that the MBMS service indicated each by a TMGI 1, a TMGI 2, and a TMGI 3 is provided. Therefore, the USD includes information indicating the TMGI 1/2/3.

The UE 100 is in the RRC connected state, and receives the USD. The UE 100 holds the received USD. Thereafter, the UE 100 transitions to the RRC idle state.

In step S602, the eNB 200 notifies, by the SIB 15, the UE 100 of the MBMS service actually provided. Here, a description proceeds with an assumption that the MBMS service indicated each by the TMGI 1 and the TMGI 2 is actually provided by the eNB 200 (MCE 11). Therefore, the SIB 15 includes information indicating the TGMI 1/2.

In step S603, the BMSC 22 notifies the MCE 11 of the updated USD.

The BMSC 22 determines to switch to the "MBMS OFF" for the MBMS service corresponding to the TMGI 2. Therefore, the BMSC 22 removes the TMGI 2 from the USD. Furthermore, the BMSC 22 determines to switch to the "MBMS ON" for the MBMS service corresponding to a TMGI 4. Therefore, the BMSC 22 adds the TMGI 4 to the USD. The BMSC 22 removes the TMGI 2 from the USD and adds the TMGI 4 to the USD to update the USD.

The MCE 11 that received the updated USD updates an actually available MBMS service (TMGI). Specifically, the actually available MBMS service is determined to be the MBMS service corresponding to the TMGI 1 and 4.

In step S604, the MCE 11 notifies the eNB 200 of the actually available MBMS service (TMGI 1 and 4).

In step S605, the eNB 200 notifies the UE 100 by an updated SIB 15 including information indicating the actually available MBMS service (TMGI 1 and 4).

In step S606, the UE 100 determines whether or not the TMGI included in the updated SIB 15 and the TMGI included in the held USD match. If the TMGI included in the updated SIB 15 (TMGI 4, for example) is not included in the held USD, the UE 100 determines that the TMGIs do not match. Furthermore, the UE 100 determines that the TMGIs do not match if the TMGI included in the held USD (TMGI 2, for example) is not included in the updated SIB 15. If the TMGIs do not match, the UE 100 determines that the USD has been updated, and starts an operation for updating the USD. Therefore, the UE 100 starts the operation for updating the USD, based on the SIB 15.

In step S607, if being in the RRC idle state, then the UE 100 establishes the RRC connection.

In step S608, the UE 100 receives the updated USD from the BMSC 22. The UE 100 holds the updated USD.

From the above description, the UE 100 can know that the USD has been updated, even in the RRC idle state.

Other Embodiments

In the above-described first embodiment (operation examples 1 and 2), although the conventional MBMS counting procedure is executed, the embodiment is not limited to this. The MCE 11 may execute other procedures for determining an actual consumption of the MBMS service (MBMS user service).

In the above-described first embodiment, the MCE 11 may notify the UE 100 of a list of TMGIs indicating the MBMS service to be counted. For example, the MCE 11 can notify, by the MBMS counting request or the enhanced MBMS counting request, the UE 100 of the list of TMGIs indicating the MBMS service to be counted. The UE 100 can include the TMGIs in the list into the MBMS counting response or the enhanced MBMS counting response.

In the above-described first embodiment (operation examples 1 to 3), instead of the MCE 11, the eNB 200 may execute the operation of the MCE 11. Furthermore, the operation of the BMSC 22 may be executed not only for the BMSC 22 to grasp the demand status of the content, but also for the MCE 11 to grasp the demand status of the content.

In the above-described second embodiment, the UE 100 determines that the USD has been updated, based on the TMGI, but the embodiment is not limited to this. The UE 100 may determine whether or not the USD has been updated, based on information included in the USD (information on at least any one of "MBMS Service ID", "Mobile Country Code (MCC)", "Mobile Network Code (MNC)", "The session start and end time", "frequencies", and "MBMS service area identities (SAIs)", for example), and information provided by the SIB. It is noted that "The session start and end time" is information indicating a start and end time of the content of the MBMS service. The "frequencies" is information indicating one or more frequencies in which the MBMS service can be provided. The "MBMS service area identities (SAIs)" is information indicating an area (MBMS service area) in which the content of the MBMS service is distributed.

The above-described first embodiment and second embodiment may be performed individually and may also be performed through a combination thereof. Furthermore, each operation example of the first embodiment may be performed individually and may also be performed through a combination thereof.

In each embodiments described above, the LTE system has been exemplified as the mobile communication system. However, the present application is not limited to the LTE system. The present application may be applied to the mobile communication system other than the LTE system.

It is noted that the entire content of U.S. Provisional Application No. 62/153,230 (filed on Apr. 27, 2015) is incorporated herein by reference.

The invention claimed is:

1. A radio terminal, comprising:
a controller, and
a receiver configured to receive a request for counting the number of certain radio terminals, which is transmitted via an MCH (Multicast Channel) from a network apparatus, the request including a predetermined value to be set as a value of a timer, wherein
the controller is configured to activate the timer in response to the reception of the request, and
the controller is configured to transmit to the network apparatus, a response to the request before the timer expires, only when the radio terminal is in an RRC idle state and is receiving a certain MBMS (Multimedia Broadcast Multicast Service) service transmitted via a certain MTCH (Multicast Traffic Channel) or interested in receiving the certain MBMS service, wherein
the certain radio terminals are radio terminals receiving the certain MBMS service or being interested in receiving the certain MBMS service.

2. The radio terminal according to claim 1, wherein
the request is stored in a field in which information indicating that the transmission on the certain MTCH is scheduled to stop can be stored.

3. The radio terminal according to claim 1, wherein
the controller is configured to include an identifier of the certain MBMS service, into the response to the request.

* * * * *